US012637334B2

(12) United States Patent
Roodenburg et al.

(10) Patent No.: US 12,637,334 B2
(45) Date of Patent: May 26, 2026

(54) MARINE CRANE AND OFFSHORE VESSEL

(71) Applicant: Itrec B.V., Schiedam (NL)

(72) Inventors: Joop Roodenburg, Schiedam (NL); Diederick Bernardus Wijning, Schiedam (NL)

(73) Assignee: ITREC B.V., Schiedam (NL)

( * ) Notice: Subject to any disclaimer, the term of this patent is extended or adjusted under 35 U.S.C. 154(b) by 192 days.

(21) Appl. No.: 18/570,442

(22) PCT Filed: Jun. 15, 2022

(86) PCT No.: PCT/EP2022/066411
§ 371 (c)(1),
(2) Date: Dec. 14, 2023

(87) PCT Pub. No.: WO2022/263566
PCT Pub. Date: Dec. 22, 2022

(65) Prior Publication Data

US 2024/0279037 A1 Aug. 22, 2024

(30) Foreign Application Priority Data

Jun. 15, 2021 (NL) ..................................... 2028458

(51) Int. Cl.
*B66C 23/82* (2006.01)
*B66C 23/53* (2006.01)
(Continued)

(52) U.S. Cl.
CPC .............. *B66C 23/82* (2013.01); *B66C 23/53* (2013.01); *B66C 23/64* (2013.01); *B63B 27/10* (2013.01); *B66C 23/185* (2013.01)

(58) Field of Classification Search
CPC ......... B66C 23/82; B66C 23/53; B66C 23/64; B66C 23/185; B63B 27/10
See application file for complete search history.

(56) References Cited

U.S. PATENT DOCUMENTS

2015/0203337 A1* 7/2015 Roodenburg ........... B63B 27/10
212/309
2016/0332849 A1* 11/2016 Roodenburg ........... B66C 23/52
2023/0150802 A1* 5/2023 Wijning .................. B66C 23/53
212/307

FOREIGN PATENT DOCUMENTS

NL 2013384 B1 9/2016
NL 2015896 B1 6/2017
(Continued)

OTHER PUBLICATIONS

Dutch Search Report, issued in Priority Application No. 2028458, dated Mar. 7, 2022.
(Continued)

*Primary Examiner* — Anna M Momper
*Assistant Examiner* — Nathaniel L Adams
(74) *Attorney, Agent, or Firm* — Birch, Stewart, Kolasch & Birch, LLP

(57) ABSTRACT

A marine slewing pedestal crane includes a boom provided with a jib having a jib-arm. The jib includes a jib base pivotally connected to a jib-axle to allow a pivotal movement of the jib with respect to the boom. The crane includes a jib positioning assembly adapted to position the jib arm and to actuate the movement of the jib arm. The jib arm positioning assembly includes a jib arm control system, including one or more sensors for monitoring a load connected to a load suspension device of a hoisting assembly of the crane, and/or a potential load, and/or a supply vessel supporting a potential load, and/or crane information. Based on the information, the jib arm control system actuates one or more cylinders to pivot the jib arm relative to the jib base.

20 Claims, 6 Drawing Sheets

(51) Int. Cl.

| | |
|---|---|
| ***B66C 23/64*** | (2006.01) |
| *B63B 27/10* | (2006.01) |
| *B66C 23/18* | (2006.01) |

(56) References Cited

FOREIGN PATENT DOCUMENTS

| | | | | |
|---|---|---|---|---|
| NL | 2016444 B1 * | 9/2017 | ........... | B66C 23/702 |
| WO | WO 2015/105414 A1 | 7/2015 | | |

OTHER PUBLICATIONS

International Search Report, issued in PCT/EP2022/066411, dated Sep. 29, 2022.

Written Opinion of the International Searching Authority, issued in PCT/EP2022/066411, dated Sep. 29, 2022.

* cited by examiner

MARINE CRANE AND OFFSHORE VESSEL

The invention relates to a marine crane, more in particular a marine slewing pedestal crane. Marine slewing pedestal cranes are generally known in the prior art. For example WO2015/105414 discloses a marine slewing pedestal crane.

It is an object of the first aspect of the invention to propose an improved marine crane. To this end, the invention provides a marine crane in accordance with claim 1.

According to the invention the marine crane is provided with a jib, the jib comprising a jib base and a jib arm, wherein the jib arm is pivotally connected to the jib base via the jib arm pivot axle. Furthermore, the crane comprises a jib arm positioning assembly, wherein the jib arm positioning assembly is adapted to position the jib arm with respect to the jib base and to actuate the movement of the jib arm. Thus, the jib arm, more in a particular a suspension point on the jib arm, can move with a load or a potential load, i.e. a load to be coupled with, and lifted by, the load suspension device.

This is in particular beneficial when lifting large loads, i.e. loads that have a relatively large length, e.g. a length of over 60 meters, for example wind turbine foundation piles also referred to as monopiles.

A monopile may have a diameter of 10 meter or more, a length of 60 meters or more and a weight of 500 mt or more. There is a trend towards larger wind turbines and a desire to install offshore wind turbines at locations with larger water depths than currently encountered. Both result in larger and heavier foundations. Hence, it is expected that in the near future monopiles need to be installed that are larger than 100 meters, possibly 120 meters or larger. The weight of such piles may be larger than 1000 mt, possibly 1300 mt or above.

Furthermore, when the load is presented on a supply vessel, the supply vessel is typically positioned parallel to the main vessel, i.e. the vessel supporting the crane. The wind and sea may cause the supply vessel to move relative to the main vessel. Heave movements can be compensated by providing the hoisting assembly of the crane with heave motion compensation. A crane according to the invention is furthermore able to compensate for movement of the supply vessel relative to the main vessel by pivoting the jib arm. In a further embodiment, the crane is furthermore configured to compensate for heave motion by pivoting the jib relative to the boom of the crane.

Furthermore, relative pitch of the supply vessel may be compensated by using two hoisting assemblies, each comprising a load suspension device, wherein the load suspension devices are connected to the load at locations spaced relative to each other along the longitudinal axis of the load. By individually controlling the hoisting assemblies, the load can be made to follow the pitch of the supply vessel.

In an embodiment, a marine slewing pedestal crane according to the invention comprises:

- a stationary pedestal, which pedestal is adapted to be mounted to a vessel;
- a crane housing, which crane housing is mounted to the pedestal and adapted to slew relative to the pedestal about a vertical slew axis;
- a boom, the boom comprising an inner end which is connected pivotally about a horizontal boom pivot axis to the crane housing, allowing an up-and-down luffing movement of the boom, and opposite thereof a forked outer end between which a jib axle extends defining a horizontal jib pivot axis;
- a boom luffing assembly for luffing the boom up and down, the boom luffing assembly comprising: a boom luffing winch, mounted on the crane housing, and an associated luffing wire, the boom luffing wire extending between the boom luffing winch and the boom;
- a jib, wherein the jib comprises:
- a jib base, wherein the jib base is pivotally connected to the jib axle to allow a pivotal movement of the jib with respect to the boom, and wherein the jib base comprises a jib arm axle that extends perpendicular to the jib axle, and
- a jib arm, wherein the jib arm has a base end and an outer end, and is at the base end pivotally connected to the jib base via the jib arm pivot axle,
- a hoisting assembly for lifting and lowering a load, the hoisting assembly comprising:
- a hoisting winch and an associated hoisting wire; and
- a load suspension device, wherein the hoisting wire extends from the hoisting winch via a suspension point at an outer end portion of the jib arm to the load suspension device, and the hoist winch allows to vary the length of the hoisting wire and thus to lower and lift the load suspension device;

- a jib positioning assembly, wherein the jib positioning assembly is adapted to support and position the jib with respect to the boom and to actuate the movement of the jib about the jib axis, the jib positioning assembly comprising:
- a jib winch, mounted to the crane housing, and an associated jib tensioner, the jib tensioner extending between the jib winch and the jib arm, wherein the jib tensioner comprises a jib tensioner wire associated with the jib winch and at least a first jib tensioner member; and
- a jib tensioner spacer structure, the spacer structure comprising a first, second and third lever arm for supporting the jib tensioner at a first, second and third support point respectively, wherein the lever arms are each fixed to the jib base and each extend radially outward from the jib axle such that the support points are spaced in a radial direction and are located at different angular positions relative to the jib axle; and wherein the first jib tensioner member extends between the outer end portion of the jib and the first support point, and wherein the first jib tensioner member comprises a tensioner member pivot axis or is pivotably connected to the first support point via a tensioner member pivot axis, which tensioner member pivot axis is parallel to, and preferably coincides with, the jib arm pivot axis;

- a jib arm positioning assembly, wherein the jib arm positioning assembly is adapted to position the jib arm with respect to the jib base and to actuate the movement of the jib arm, the jib arm positioning assembly comprising:
- one or more, preferably two, jib arm pivot cylinders are provided, wherein the cylinders are connected with one end to the jib base and an opposite end to the jib arm, for controlling, e.g. dampen or actuate, the movement of the jib arm about the jib arm pivot axis;
- a jib arm control system, comprising one or more sensors for monitoring a load connected to the load suspension device, and/or a potential load, and/or a supply vessel supporting a potential load, and/or crane information, e.g. load on the wire, movement of the load suspension device, etc., and, based on the information of the one or more sensors, actuate the one or more cylinders to pivot the jib arm relative to the jib base, and preferably make the suspension point follow a load or a potential load in at least one direction to thus for example compensate for movement of a supply vessel relative to the crane.

The jib axle defines the jib pivot axis. The jib is connected to the boom via the jib axle. The jib axle thus allows for pivoting the jib relative to the boom about the jib pivot axis. Similarly, the jib arm axle defines the jib arm pivot axis. The jib arm is connected to the jib base via the jib arm axle. The jib arm axle thus allows for pivoting the jib arm relative to the jib base, and thus relative to the boom, about the jib arm pivot axis.

Also, the first jib tensioner member comprises a tensioner member pivot axis, or is pivotably connected to the first support point, via a tensioner member pivot axis. The tensioner member pivot axis is parallel to, and preferably coincides with, the jib arm pivot axis.

In an embodiment, the jib tensioning member comprises a second jib tensioner member, extending between the first and second support point, and optionally comprises a third jib tensioner member, extending between the second and third support point.

In an embodiment, the jib tensioner comprises a set of tensioner sheaves, and the jib tensioning wire is luffed between a set of sheaves mounted on the crane housing and the set of tensioner sheaves, and wherein optionally the set of tensioner sheaves is mounted to the third lever arm at the third support point.

In an embodiment, the third, and optionally the second or the second and third support point, comprise a cradle for receiving the jib tensioner in a radial direction, and wherein the jib tensioner, when the jib is pivoted into an extend position, is released from one or more of the cradles.

In an embodiment, the jib tensioner members comprise metal sections or links, e.g. pivotably connected steel sections, and/or chains, preferably comprise two parallel strips.

In an embodiment, the jib tensioner wire is guided via a heave compensation cylinder for providing the jib with heave compensation and/or the jib winch is provided with a jib winch control system configured for providing the jib with heave compensation.

In an embodiment, the jib tensioner comprises one or more cylinders for providing the jib with heave compensation.

In a further embodiment, the jib arm control system is configured to control one or more heave compensation cylinders and/or the jib winch for providing the jib with heave compensation.

In an embodiment, the hoisting wire is guided via a heave compensation cylinder for providing the load suspension device with heave compensation and/or the hoisting winch is provided with a hoisting winch control system configured for providing the load suspension device with heave compensation, and wherein preferably the heave compensation cylinder is configured to control the hoisting wire heave compensation cylinder and/or is part of the hoisting winch control system configured for providing the load suspension device with heave compensation.

In an embodiment, the hoisting wire is looped from the load suspension device to a second hoisting winch, mounted on the crane housing, and the hoisting wire is thus at opposite ends connected to a hoisting winch.

In an embodiment, the suspension point is spaced from the outer end of the jib arm, and wherein the hoisting wire is guided from the hoisting winch via a sheave at the outer end of the jib arm to the suspension point and from there to the load suspension device.

In an embodiment, the crane further comprises a control system that controls both the boom winch and the jib winch, and which control system is configured to control those winches such that the suspension point is moved in a horizontal direction away or towards the pedestal.

In an embodiment, the crane comprises a second hoisting assembly for lifting and lowering a load, the second hoisting assembly comprising:

- a hoist winch, mounted to the crane housing, and an associated hoisting wire; and
- a load suspension device, wherein the hoisting wire extends from the hoisting winch via a suspension point at the outer end of the jib arm to the object suspension device, and the hoist winch allows to vary the length of the hoisting wire and thus to lower and lift the load suspension device.

In an embodiment, the hoisting device and the second hoisting device are each provided with a departing sheave at the suspension point, and wherein the rotational axis of the departure sheaves extend parallel to each other and substantially perpendicular to a longitudinal axis of the jib arm.

In an embodiment, the crane further comprising a double load suspension device support at tip end of the jib for temporarily attaching the load suspension device and the second load suspension device to the jib when not in use.

In an embodiment, the operational range of the load suspension device relative to a center of the stationary pedestal—in a radial direction—extends over at least 60 m, preferably at least 70 m.

The invention furthermore provides a vessel comprising a crane according to the invention.

In an embodiment, the vessel further comprises a boom rest for supporting the boom in a rest position, which boom rest engages the boom at an outer end thereof, such that the column and the jib are located on opposite sides of the boom rest when the boom is in its rest position, wherein preferably the height of the boom rest is at least the length of the jib such that the jib can extend at a substantially right angle to the boom when the latter is in its support position on the boom rest.

The invention furthermore provides a method for transferring a pile form a supply vessel onto a vessel according to the invention, the method comprising:

- positioning the pile substantially parallel to the longitudinal axis of the vessel supporting the crane according to the invention;
- lifting the pile from a storage deck of the supply vessel, allowing the boom arm to pivot about the jib axle and/or about the jib arm axle to thus provide motion compensation, and preferably follow movement of a potential load on a supply vessel;
- dampening the pivoting movement of the jib arm;
- stabilising the pile relative to the crane base using riggers;
- moving the pile above a storage deck of the vessel, preferably while stabilising the pile relative to the crane base using riggers; and
- lowering the pile onto the storage deck of the vessel.

In an embodiment according to the invention, the boom is not a forked boom but is a single arm boom and the jib base is hingedly connected to the boom via a single bearing, the bearing being provided between the boom and the jib bae.

The invention furthermore provides marine slewing pedestal crane comprising:

- a stationary pedestal, which pedestal is adapted to be mounted to a vessel;
- a crane housing, which crane housing is mounted to the pedestal and adapted to slew relative to the pedestal about a vertical slew axis;

a boom, the boom comprising an inner end which is connected pivotally about a horizontal boom pivot axis to the crane housing, allowing an up-and-down luffing movement of the boom, and opposite thereof a forked outer end between which a jib axle extends defining a horizontal jib pivot axis;

a boom luffing assembly for luffing the boom up and down, the boom luffing assembly comprising: a boom luffing winch, mounted on the crane housing, and an associated luffing wire, the boom luffing wire extending between the boom winch and the boom;

a jib, wherein the jib comprises:

a jib base, wherein the jib base is pivotally connected to the jib axle to allow a pivotal movement of the jib with respect to the boom, and wherein the jib base comprises a jib arm axle that extends perpendicular to the jib axle, and a jib arm, wherein the jib arm has a base end and an outer end, and is at the base end pivotally connected to the jib base via the jib arm pivot axis a hoisting assembly for lifting and lowering a load, the hoisting assembly comprising:

a hoisting winch and an associated hoisting wire; and a load suspension device, wherein the hoisting wire extends from the hoisting winch via a suspension point at an outer end portion of the jib arm to the object suspension device, and the hoist winch allows to vary the length of the hoisting wire and thus to lower and lift the load suspension device;

a jib positioning assembly, wherein the jib positioning assembly is adapted to support and position the jib with respect to the boom and to actuate the movement of the jib, the jib positioning assembly comprising:

a jib support cylinder, which support cylinder is with one end connected to the jib arm such that the cylinder can pivot relative to the jib arm about a first pivot axis, which first pivot axis is parallel to the jib pivot axis, and is connected to the boom such that the cylinder can pivot relative to the boom about a first pivot axis and a second pivot axis, which first pivot axis coincides with the jib arm pivot axis and which second pivot axis is parallel to the jib pivot axis, a jib arm positioning assembly, comprising;

one or more, preferably two, jib arm pivot cylinders are provided, wherein the cylinders are connected with one end to the jib base and an opposite end to the jib arm, for controlling, e.g. dampen or actuate, the movement of the jib arm about the jib arm pivot axis;

a jib arm control system, configured to control the jib support cylinder to pivot the jib arm about the jib pivot axis relative to the boom, and the jib arm pivot cylinders to pivot the jib arm about the jib arm pivot axis, the jib arm control system furthermore comprising one or more sensors for monitoring a load connected to the load suspension device, and/or a potential load, and/or a supply vessel supporting a potential load, and/or crane information, e.g. load on the wire, movement of the load suspension device, etc., and, based on the information of the one or more sensors, actuate the one or more cylinders to pivot the jib arm about the jib arm pivot axis, and preferably make the suspension point follow a load or a potential load in at least one direction to thus for example compensate for movement of a supply vessel relative to the crane.

Advantageous embodiments of the installation vessel according to the invention and the method according to the invention are disclosed in the sub claims and in the description, in which the invention is further illustrated and elucidated on the basis of a number of exemplary embodiments, of which some are shown in the schematic drawing. In the figures, components corresponding in terms or construction and/or function are provided with the same last two digits of the reference numbers.

It will be appreciated by the skilled person that a technical feature discussed herein as required or as optional with respect to one embodiment of the invention may be equally applicable to one or more other embodiments described herein, with the feature performing its designation function. Such combinations are all envisaged herein unless a combination would result in a technical impossible solution and/or not meet the desired functionality.

IN THE FIGURES

FIG. 1 and FIG. 2 show a first exemplary embodiment of a marine crane 1 according to the invention, in FIG. 1 with a boom and a jib in a raised positions, and in FIG. 2 with the boom in a lowered position;

FIG. 3 shows a second exemplary embodiment of a marine crane according to the invention, with a boom in a raised and a jib in a lowered position. The components that are similar to the exemplary embodiment shown in FIG. 1 and FIG. 2 are provided with identical reference signs.

Figure 1:
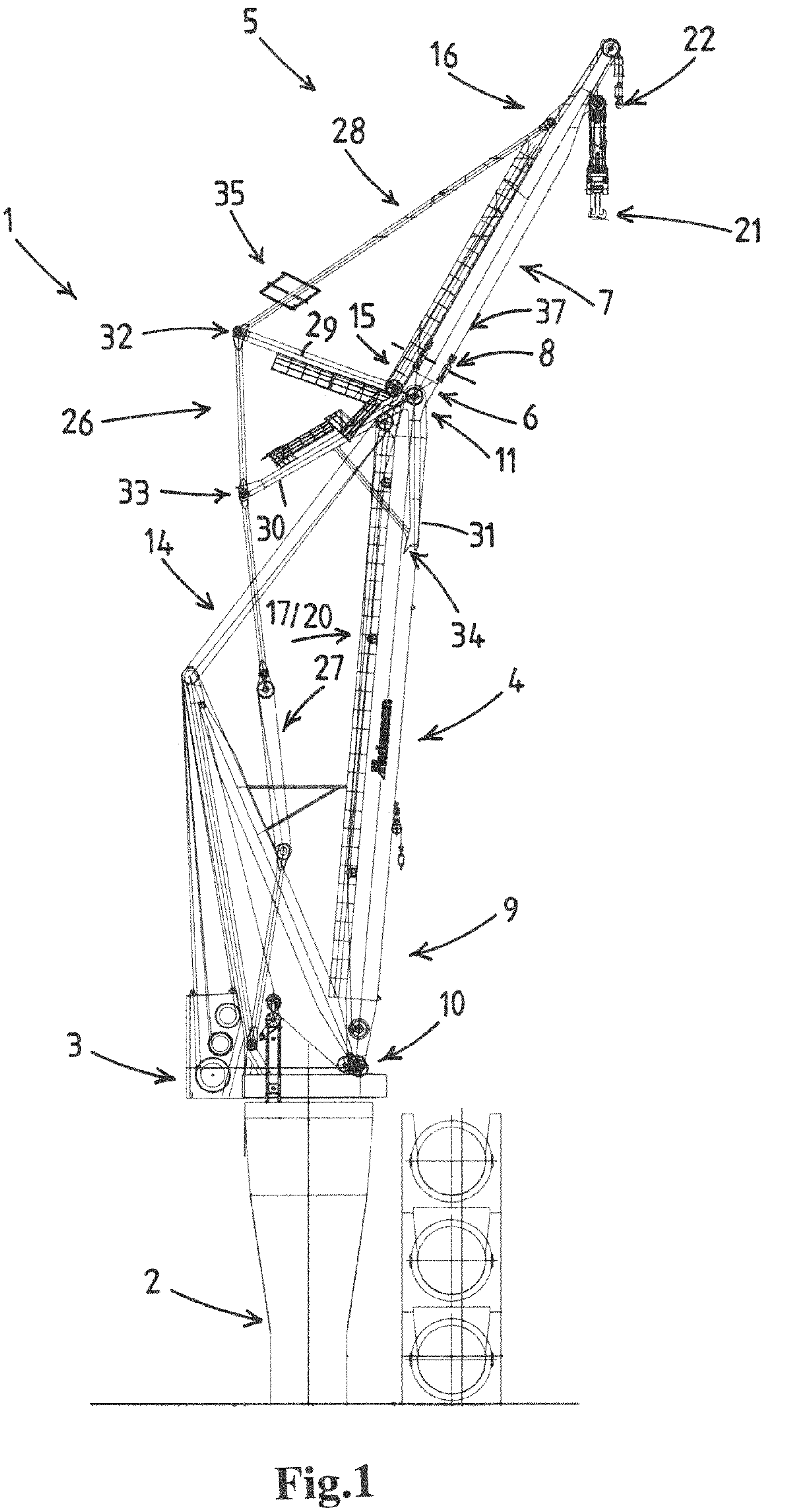
FIG. 1 shows a first exemplary embodiment of a marine crane according to the invention with a boom and a jib in a raised positions.
Figure 2:
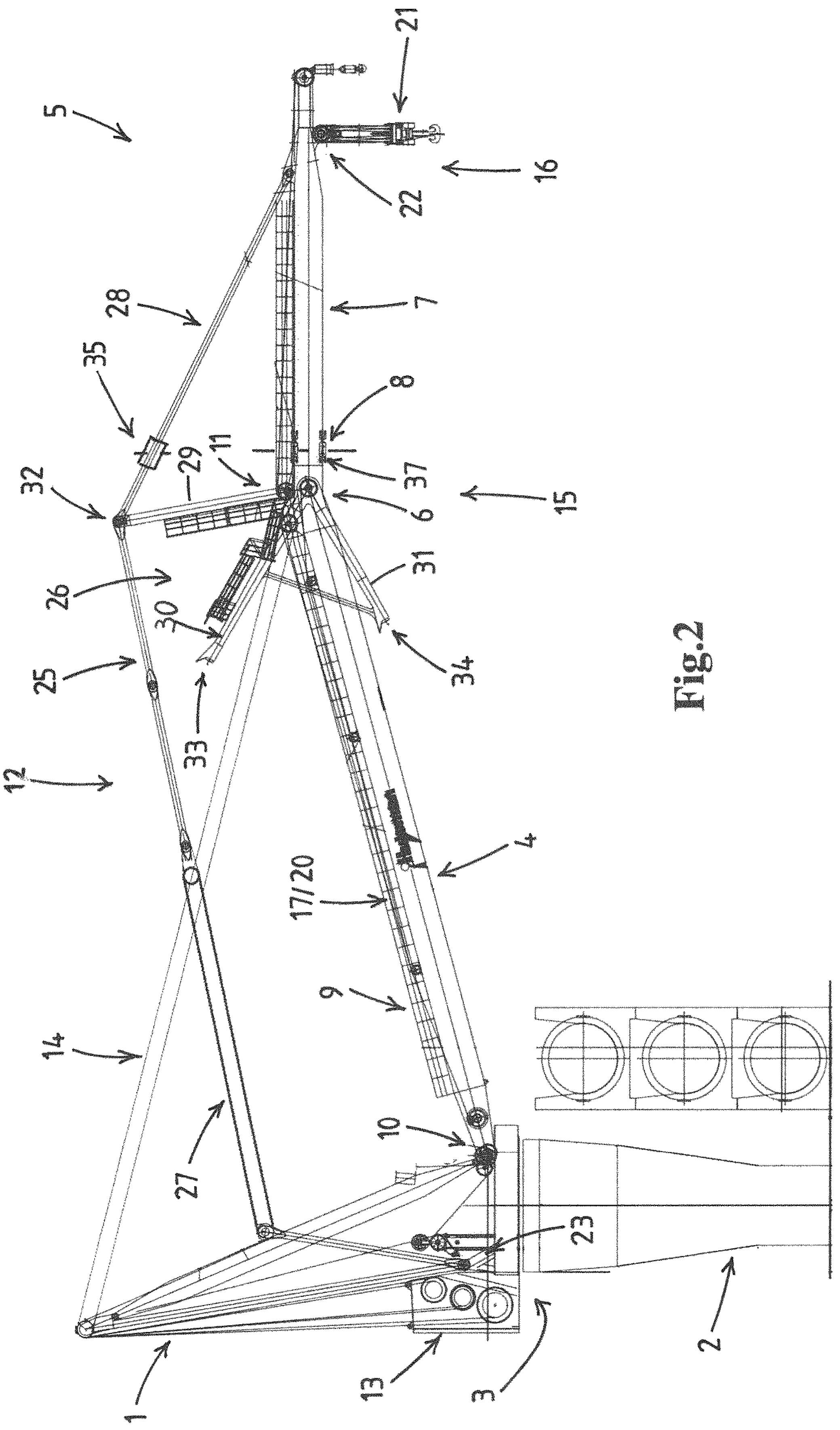
FIG. 2 shows the marine crane of FIG. 1 with the boom in a lowered position.
Figure 3:
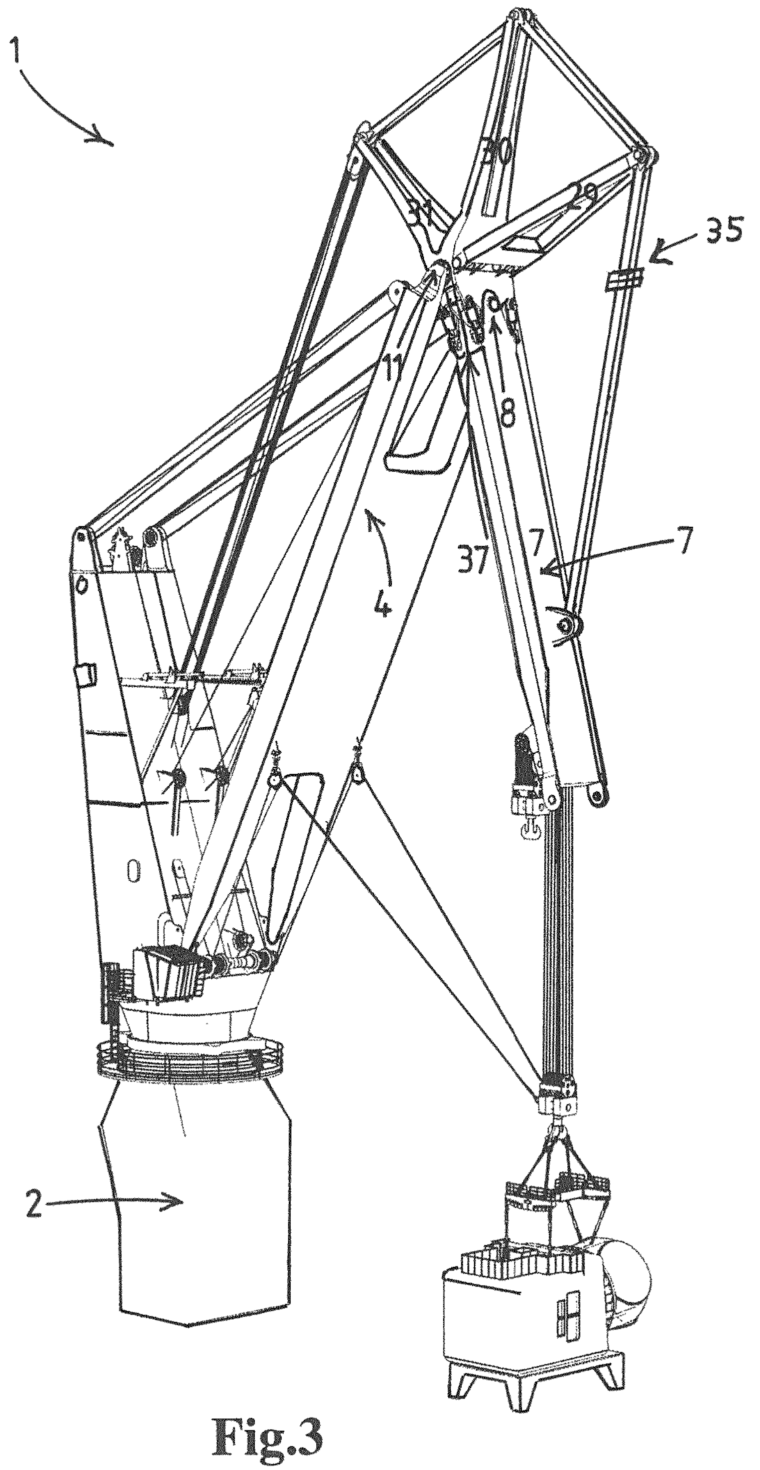
FIG. 3 shows a second exemplary embodiment of a marine crane according to the invention, with a boom in a raised and a jib in a lowered position.
Figure 4:
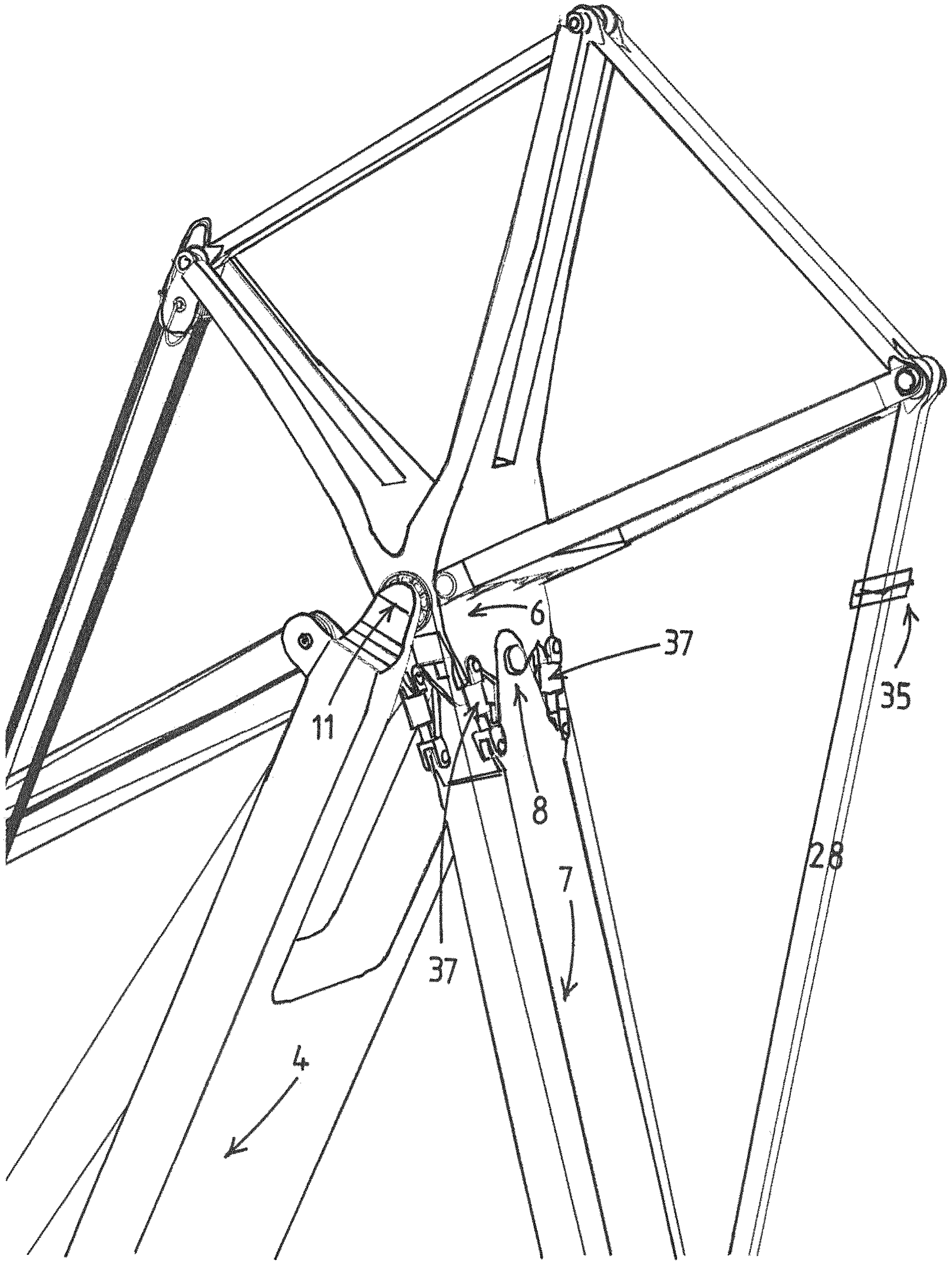
FIG. 4 shows an enlarged sectional view of the boom and jib of the crane of FIG. 4.

The marine slewing pedestal crane 1 according to the invention comprises a stationary pedestal 2, a crane housing 3, a boom 4, and a jib, 5. The jib 5 comprise a jib 6 base and a jib arm 7, wherein the jib arm is connected to the jib base via a jib arm pivot axis 8.

The stationary pedestal 2 is adapted to be mounted to a vessel.

The crane housing 3 is mounted to the pedestal 2 and is adapted to slew relative to the pedestal 2 about a vertical slew axis. Typically, a slew bearing is provided between the pedestal and the crane housing.

The 4 comprises an inner end 9, which inner end is connected pivotally about a horizontal boom pivot axis 10 to the crane housing 3, allowing an up-and-down luffing movement of the boom, and opposite thereof has a forked outer end 10 between which a jib axle extends defining a horizontal jib pivot axis 11.

The crane furthermore comprises a boom luffing assembly 12 for luffing the boom up and down. The boom luffing assembly comprises a boom luffing winch 13 and an associated boom luffing wire 14. The boom luffing winch is mounted on the crane housing 3. The boom luffing wire 14 extends between the boom winch 13 and the boom 4.

The jib 5 comprises the jib base 6 and the jib arm 7. The jib base 6 is pivotally connected to the jib axle to allow a pivotal movement of the jib 5 with respect to the boom 4. The jib base 6 comprises a jib arm axle 8 that extends perpendicular to the jib axle 11. The jib arm 7 has a base end 15 and an outer end 16, and is at the base end pivotally connected to the jib base 6 via the jib arm pivot axis 8.

The crane furthermore comprises a hoisting assembly 17 for lifting and lowering a load 18. The hoisting assembly 17 comprises a hoisting winch 19, an associated hoisting wire 20, and a load suspension device 20. The hoisting wire 20 extends from the hoisting winch 19 via a suspension point 22 at an outer end portion of the jib arm 7 to the load suspension device 21. The hoisting winch 19 allows to vary the length of the hoisting wire 20 and thus to lower and lift the load suspension device 21.

The crane furthermore comprises a jib positioning assembly 23. The jib positioning assembly 23 is adapted to support and position the jib 5 with respect to the boom 4 and to actuate the movement of the jib. The jib positioning assembly 23 comprises a jib winch 24, a jib tensioner 25 and a jib tensioner spacer structure 26.

The jib winch 24 is mounted to the crane housing 3. The jib tensioner 25 extends between the jib winch 24 and the jib arm 7. The jib tensioner 25 comprises a jib tensioner wire 27, associated with the jib winch 24, and at least a first jib tensioner member 28.

The jib tensioner spacer structure 26 comprises a first lever arm 29, a second lever arm 30 and a third lever arm 31 for supporting the jib tensioner 25 at a first support point 32, second support point 33 and third support point 34 respectively. The lever arms are each fixed to the jib base 6 and each extend radially outward from the jib axle 11 such that the support points are spaced in a radial direction and are located at different angular positions relative to the jib axle.

The first jib tensioner member 28 extends between the outer end portion of the jib arm 7 and the first support point 32. In the embodiment shown, the first jib tensioner member 28 comprises a tensioner member pivot axis 35, which tensioner member pivot axis is parallel to, and coincides with, the jib arm pivot axis 8.

In an alternative embodiment, the first jib tensioner member is pivotably connected to the first support point via a tensioner member pivot axis, which tensioner member pivot axis is parallel to, and preferably coincides with, the jib arm pivot axis;

The crane furthermore comprises a jib arm positioning assembly 36 that is adapted to position the jib arm with respect to the jib base and to actuate the movement of the jib arm, the jib arm positioning assembly comprising.

In the exemplary embodiment shown, two jib arm pivot cylinders 37 are provided. The jib arm pivot cylinders are connected with one end to the jib base 6 and an opposite end to the jib arm 7, for controlling, e.g. dampen or actuate, the movement of the jib arm about the jib arm pivot axis 8.

The jib arm positioning assembly 36 furthermore comprises a jib arm control system 38. The jib arm control system comprises sensors for monitoring a load connected to the load suspension device, and a potential load, i.e. a load to be connected to the load suspension device. in the exemplary embodiment shown, these sensors comprise camera's mounted on the boom of the crane. In addition or as an alternative for example lidar or laser scanners can be provided.

Also, in addition or as an alternative to tracking the movement of the load, the movement of a supply vessel supporting the potential load can be monitored.

Based on the information of the one or more sensors, the jib arm control system 29 actuates the one or more jib arm pivot cylinders 37 to pivot the jib arm 7 relative to the jib base 6, and can thus make the suspension point, and therefore the load suspension device, follow the load or the potential load in at least one direction to thus for example compensate for movement of a supply vessel relative to the crane.

In the embodiment shown, the jib tensioning member comprises a second jib tensioner member, extending between the first and second support point, and a third jib tensioner member, extending between the second and third support point.

In the embodiment shown, the jib tensioner comprises a set of tensioner sheaves, and the jib tensioning wire is luffed between a set of sheaves mounted on the crane housing and the set of tensioner sheaves, and the set of tensioner sheaves is mounted to the third lever arm at the third support point.

In the embodiment shown, the third, and the second or the second and third support point, comprise a cradle for receiving the jib tensioner in a radial direction, and the jib tensioner, when the jib is pivoted into an extend position, is released from one or more of the cradles.

In the embodiment shown, the jib tensioner members comprise metal sections or links, more in particular comprise two parallel strips.

Figure 5:
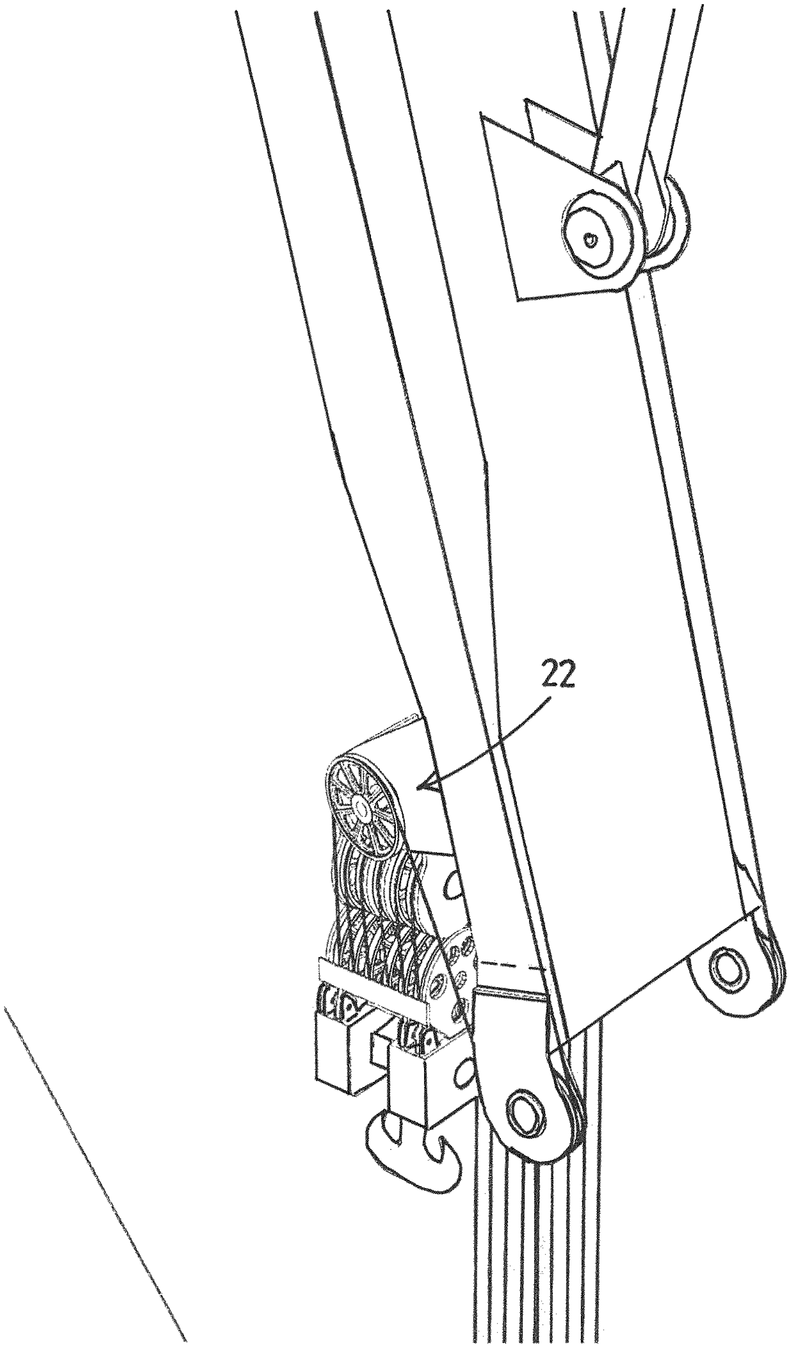
FIG. 5 shows an enlarged sectional view of an end of a jib arm of the crane of FIG. 4.
Figure 6:
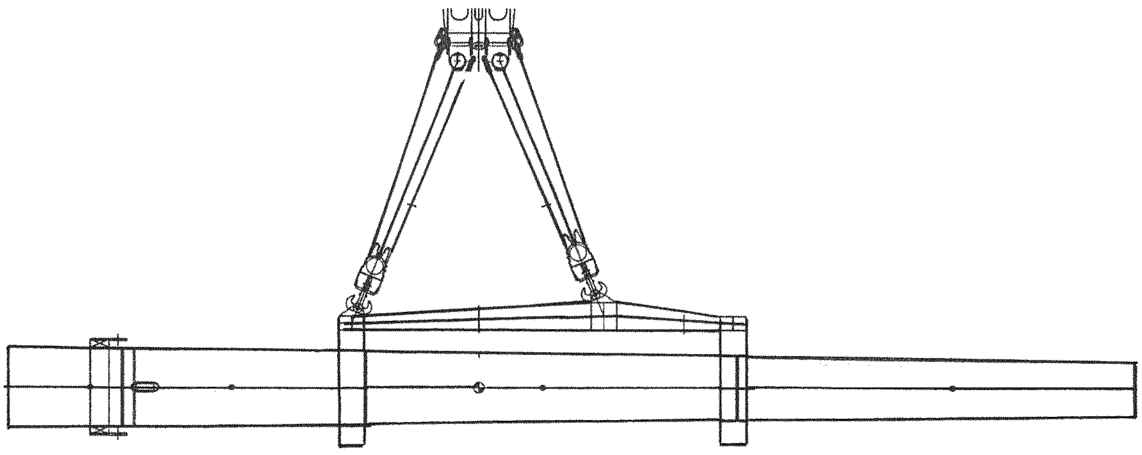
FIG. 6 shows a load supported by the crane of FIG. 1.

In the embodiment shown, the suspension point is spaced from the outer end of the jib arm, and the hoisting wire is guided from the hoisting winch via a sheave at the outer end of the jib arm to the suspension point and from there to the load suspension device. See FIG. 5.

In the embodiment shown, the crane comprises a second hoisting assembly for lifting and lowering a load, the second hoisting assembly comprising a hoist winch, mounted to the crane housing, and an associated hoisting wire and a load suspension device. The hoisting wire extends from the hoisting winch via a suspension point at the outer end of the jib arm to the object suspension device, and the hoist winch allows to vary the length of the hoisting wire and thus to lower and lift the load suspension device.

REFERENCE SIGNS

01 marine crane
02 stationary pedestal
03 crane housing
04 boom
05 jib
06 jib base
07 jib arm
08 jib arm pivot axis/axle
09 inner end boom
10 boom pivot axis
11 jib pivot axle/axis
12 boom luffing assembly
13 boom luffing winch
14 boom luffing wire
15 base end jib arm
16 outer end jib arm
17 hoisting assembly
18 load
19 hoisting winch
20 hoisting wire
21 load suspension device
22 suspension point
23 jib positioning assembly
24 jib winch
25 jib tensioner
26 jib tensioner spacer structure
27 jib tensioner wire
28 jib tensioner member

29 first lever arm
30 second lever arm
31 third lever arm
32 first support point
33 second support point
34 third support point
35 tensioner member pivot axis
36 jib arm positioning assembly
37 jib arm pivot cylinders
38 jib arm control system

The invention claimed is:

1. A marine slewing pedestal crane comprising:

a stationary pedestal, the stationary pedestal being adapted to be mounted to a vessel;

a crane housing, the crane housing being mounted to the stationary pedestal and being adapted to slew relative to the stationary pedestal about a vertical slew axis;

a boom, the boom comprising an inner end connected pivotally about a horizontal boom pivot axis to the crane housing, allowing an up-and-down luffing movement of the boom, and having opposite thereof a forked outer end between which a jib axle extends defining a horizontal jib pivot axis;

a boom luffing assembly for luffing the boom up and down, the boom luffing assembly comprising a boom luffing winch, mounted on the crane housing, and an associated boom luffing wire, the boom luffing wire extending between the boom luffing winch and the boom;

a jib, wherein the jib comprises:

a jib base, wherein the jib base is pivotally connected to the jib axle to allow a pivotal movement of the jib with respect to the boom, and wherein the jib base comprises a jib arm axle that extends perpendicular to the jib axle; and a jib arm, wherein the jib arm has a base end and an outer end, the base end being pivotally connected to the jib base via a jib arm pivot axis;

a hoisting assembly for lifting and lowering a load, the hoisting assembly comprising:

a hoisting winch and an associated hoisting wire; and a load suspension device, wherein the hoisting wire extends from the hoisting winch via a suspension point at an outer end portion of the jib arm to the load suspension device, and the hoist winch allows to vary the length of the hoisting wire and thus to lower and lift the load suspension device;

a jib positioning assembly, wherein the jib positioning assembly is adapted to support and position the jib with respect to the boom and to actuate the movement of the jib, the jib positioning assembly comprising:

a jib winch, mounted to the crane housing, and an associated jib tensioner, the jib tensioner extending between the jib winch and the jib arm, wherein the jib tensioner comprises a jib tensioner wire associated with the jib winch and at least a first jib tensioner member; and a jib tensioner spacer structure, the spacer structure comprising a first, second and third lever arm for supporting the jib tensioner at a first, second and third support point respectively, wherein the lever arms are each fixed to the jib base and each extend radially outward from the jib axle such that the support points are spaced in a radial direction and are located at different angular positions relative to the jib axle, and wherein the first jib tensioner member extends between the outer end portion of the jib arm and the first support point, and wherein the first jib tensioner member comprises a tensioner member pivot axis or is pivotably connected to the first support point via a tensioner member pivot axis, the tensioner member pivot axis being parallel to the jib arm pivot axis; and a jib arm positioning assembly, wherein the jib arm positioning assembly is adapted to position the jib arm with respect to the jib base and to actuate the movement of the jib arm, the jib arm positioning assembly comprising:

one or more jib arm pivot cylinders, the one or more jib arm pivot cylinders being connected with one end to the jib base and an opposite end to the jib arm, for controlling the movement of the jib arm about the jib arm pivot axis; and a jib arm control system, comprising one or more sensors for monitoring a load connected to the load suspension device, and/or a potential load, and/or a supply vessel supporting a potential load, and/or crane information, and, based on the information of the one or more sensors, actuate the one or more jib arm pivot cylinders to pivot the jib arm relative to the jib base, and make the suspension point follow a load or a potential load in at least one direction, and wherein the jib tensioner wire is guided via a heave compensation cylinder for providing the jib with heave compensation and/or the jib winch is provided with a jib winch control system configured for providing the jib with heave compensation.

2. The crane according to claim 1, wherein the jib tensioning member comprises a second jib tensioner member, extending between the first and second support point.

3. The crane according to claim 1, wherein the jib tensioner comprises a set of tensioner sheaves, and the jib tensioning wire is luffed between a set of sheaves mounted on the crane housing and the set of tensioner sheaves.

4. The crane according to claim 1, wherein the third support point or the second support point comprises, or the second support point and third support point comprise a cradle for receiving the jib tensioner in a radial direction, and wherein the jib tensioner, when the jib is pivoted into an extend position, is released from one or more of the cradles.

5. The crane according to claim 1, wherein the jib tensioner members comprise metal sections or links and/or chains.

6. The crane according to claim 1, wherein the jib tensioner comprises one or more cylinders for providing the jib with heave compensation.

7. The crane according to claim 1, wherein the jib arm control system is configured to control one or more heave compensation cylinders and/or the jib winch for providing the jib with heave compensation.

8. The crane according to claim 1, wherein the hoisting wire is guided via a heave compensation cylinder for providing the load suspension device with heave compensation and/or the hoisting winch is provided with a hoisting winch control system configured for providing the load suspension device with heave compensation.

9. The crane according to claim 1, wherein the heave compensation cylinder is part of the hoisting winch control system configured for providing the load suspension device with heave compensation.

10. The crane according to claim 1, wherein the hoisting wire is looped from the load suspension device to a second hoisting winch, mounted on the crane housing, and the hoisting wire is thus at opposite ends connected to a hoisting winch.

11. The crane according to claim 1, wherein the suspension point is spaced from the outer end of the jib arm, and wherein the hoisting wire is guided from the hoisting winch via a sheave at the outer end of the jib arm to the suspension point and from there to the load suspension device.

12. The crane according to claim 1, wherein the crane further comprises a control system that controls both the boom winch and the jib winch, the control system being configured to control the boom winch and the jib winch such that the suspension point is moved in a horizontal direction away or towards the pedestal.

13. The crane according to claim 1, wherein the crane comprises a second hoisting assembly for lifting and lowering a load, the second hoisting assembly comprising:

a second hoisting winch, mounted to the crane housing, and an associated second hoisting wire; and a second load suspension device, wherein the second hoisting wire extends from the second hoisting winch via a second suspension point at the outer end of the jib arm to the second load suspension device, and the second hoisting winch allows to vary the length of the second hoisting wire and thus to lower and lift the second load suspension device.

14. The crane according to claim 13, wherein the hoisting assembly and the second hoisting assembly are each provided with a departing sheave at their respective suspension point, and wherein the rotational axis of the respective departure sheaves extend parallel to each other and perpendicular to a longitudinal axis of the jib arm.

15. The crane according to claim 13, further comprising a double load suspension device support at tip end of the jib for temporarily attaching the load suspension device and the second load suspension device to the jib when not in use.

16. The crane according to claim 1, wherein the operational range of the load suspension device relative to a center of the stationary pedestal, in a radial direction, extends over at least 60 m.

17. The crane according to claim 1, wherein the tensioner member pivot axis coincides with the jib arm pivot axis.

18. A vessel comprising the crane according to claim 1.

19. The vessel according to claim 18, wherein the vessel further comprises a boom rest for supporting the boom in a rest position, the boom rest engaging the boom at an outer end thereof, such that a column and the jib are located on opposite sides of the boom rest when the boom is in the rest position.

20. A method for transferring a pile from a supply vessel onto the vessel according to claim 18, the method comprising:

positioning the pile parallel to the longitudinal axis of the vessel supporting the crane;

lifting the pile from a storage deck of the supply vessel, allowing the jib arm to pivot about the jib axle to thus provide motion compensation;

dampening the pivoting movement of the jib arm;

stabilising the pile relative to the crane base using riggers;

moving the pile above a storage deck of the vessel; and lowering the pile onto the storage deck of the vessel.

* * * * *